(12) United States Patent
Rice, III

(10) Patent No.: US 6,715,232 B1
(45) Date of Patent: Apr. 6, 2004

(54) FLOWER POT

(76) Inventor: Frank W. Rice, III, 131 George St., Excelsior, MN (US) 55331

( * ) Notice: Subject to any disclaimer, the term of this patent is extended or adjusted under 35 U.S.C. 154(b) by 0 days.

(21) Appl. No.: 10/328,668

(22) Filed: Dec. 24, 2002

(51) Int. Cl.$^7$ .............................. A01G 9/02; A47G 7/02
(52) U.S. Cl. ........................................ 47/66.6; 47/39
(58) Field of Search .................. 47/65.5, 66.6, 47/39

(56) References Cited

U.S. PATENT DOCUMENTS

| | | | | |
|---|---|---|---|---|
| 3,293,798 A | * | 12/1966 | Johnson, Sr. ................. 47/83 |
| 3,747,267 A | * | 7/1973 | Linder ......................... 47/67 |
| 4,227,343 A | * | 10/1980 | Espy et al. .................... 47/39 |
| 4,597,221 A | * | 7/1986 | Adair et al. ................. 47/66.6 |
| 4,635,394 A | * | 1/1987 | Brown .......................... 47/67 |
| 4,821,454 A | * | 4/1989 | Wilds ........................ 47/41.01 |
| 5,404,672 A | * | 4/1995 | Sanderson ..................... 47/82 |
| 5,826,373 A | * | 10/1998 | Mrdjenovich ................. 47/33 |
| 6,029,937 A | * | 2/2000 | Funaro ........................ 248/146 |
| 6,202,349 B1 | * | 3/2001 | Kanagawa et al. ............ 47/83 |
| 6,345,466 B1 | * | 2/2002 | Venanzi ..................... 47/66.1 |

FOREIGN PATENT DOCUMENTS

| | | | | |
|---|---|---|---|---|
| DE | 29712649 U1 | * | 12/1997 | ............. A01J/9/02 |
| GB | 2204785 A | * | 11/1988 | ......... F16M/13/00 |

* cited by examiner

*Primary Examiner*—Son T Nguyen
(74) *Attorney, Agent, or Firm*—Robert A. Elwell

(57) ABSTRACT

A flower pot for covering the top of a post has a central capped receiver channel with a square channel extending upward from the bottom of the flower pot, a transition channel extending upward from the square channel, a cylindrical channel extending upward from the transition channel and an upper cap. The flower pot accepts and self-centers on a variety of posts. An optional knock-out in the cap also allows the flower pot to be hung from an overhead support.

12 Claims, 5 Drawing Sheets

FLOWER POT

BACKGROUND OF INVENTION

The present invention relates to flower pots and, in particular, relates to flower pots that may serve as decorative and protective covers for post tops.

Flower pots are commonly encountered in the landscaping industry, the gardening industry, as well as cemeteries and flower shops. Typically, most flower pots rest on shelves or tables or are held by the exterior of the flower pot in receptive hangers which in turn are attached to posts or overhead structures. The receptive hangers add to complexity and significantly detract from the decorative aspect of the flower pots they are intended to support. In the case of posts, such as dock posts or fence posts, many of the receptive hangers also may tend to apply an uneven force to the post.

It would be highly desirable to provide an integral post receiver internal to or within a flower pot. Preferably, a flower pot having such a built-in feature would fit a variety of post sizes and types, and more preferably also include some means for causing the pot to self-center upon the variety of posts.

It would also be highly desirable if the internal receiver of the flower pot could support the flower pot from an overhead structure in order to allow an alternative manner of supporting the flower pot. Preferably, the internal receiver can be modified to accept a chain, rope, eye or other simplified internal hangers, which do not interfere with nor obscure the decorative external appearance aspect of the flower pot.

SUMMARY OF INVENTION

The present invention in a first embodiment is a flower pot, suitable for covering the upper end of a post. The flower pot includes an outer shell. Preferably, the outer shell has a radially symmetrical shape and defines a central axis, with examples of such outer shell shapes being a cylindrical or frustoconical shape with an upper end and a lower end. Alternatively, the outer shell is any one of a variety of more complex shapes, but most preferably symmetrical about a central axis and having an upper and a lower end. Optionally, the outer shell might be decorative in appearance. It should be specially noted that the present invention does not cover, interfere with, or otherwise obscure the outer shell, thereby retaining the optional decorative appearance, if any, of the outer shell. A bottom panel is attached to and situated adjacent to the lower end of the outer shell. A square aperture is centered in the bottom panel and from the square aperture, a square central channel is connected to and aligned with the square aperture. The square channel has a lower end and an upper end. A transition central channel is connected to the upper end of the square central channel, the transition central channel has a lower end and an upper end. A cylindrical central channel is connected to the upper end of the transition central channel, the cylindrical central channel having an upper end and a lower end. An upper end cap or dome is connected to the upper end of the cylindrical central channel, the end cap including means for centering a post end. Together, the square central channel, the transition central channel, the cylindrical central channel and the end cap define a capped central channel disposed along the central axis defined by the outer shell. A flower growing space is present between the capped central channel and the outer shell. Means for centering a post segment within the capped central channel is also preferably included in the central channel. A variety of posts can interact with the central channel to support the flower pot, including the bottom panel, the outer shell and any flowers and growth media and flowers carried in the space between the capped central channel and the outer shell.

In another embodiment the present invention is a flower pot for capping and protecting a top of a post. The flower pot includes a capped central channel, the capped central channel defining an axis and includes a cap with means for centering a post end relative to the cap, a cylindrical central channel is connected at an upper end to the cap, a transition central channel connected at an upper end to a lower end of the cylindrical channel, a square central channel connected at an upper end to a lower end of the transition channel, the square central channel having a lower end, and, means for centering a post segment within the capped central channel. A bottom panel is connected to the lower end of the square central channel and has a square aperture aligned with the square central channel of the capped central channel. An outer shell is connected to the bottom panel at a lower end of the outer shell, the outer shell is preferably radially symmetrical relative to the axis of the central channel. A flower growing space is present between the capped central channel and the outer shell. The capped central channel supports the bottom panel and outer shell as well as growth media and flowers carried in the flower pot. Precipitation and moisture are deflected away from the post top by the capped central channel and into the flower growing space between the capped central channel and the outer shell.

In another embodiment, the flower pot includes a self-centering insert. The insert has square shaped panel, optionally and preferably, with depending walls. The insert is sized to be a press fit in the upper end of the square channel and preferably does not enter the transition channel. Centered in the square shaped panel is an aperture. The aperture is irregularly shaped and has a plurality of center oriented resilient fingers, which serve to self-center the flower pot relative to a segment of post passing though the aperture and interacting with the fingers. Preferably, there are several sets or classes of fingers present. Most preferably, the fingers include a long class of fingers, a short class of fingers, and an intermediate set of fingers with a length intermediate the long and short classes of fingers. Most preferably the fingers are distributed about the outer most periphery of the aperture such that they are radially spaced and distributed evenly with respect to members of their own class and any other classes of fingers present. In a most preferred embodiment of the insert of the present invention, the class of longer fingers consists of three fingers, each oriented and radially distributed about the center axis of the flower pot, at about 120° to each other; the class of intermediate fingers consists of three fingers, each oriented and radially distributed about the center axis at about 120° to each other and offset at about 60° to the class of longer fingers; and the class of shorter fingers consists of six fingers, each oriented and radially distributed about the center axis at about 60° to each other and offset at about 30° relative to members of the longer and intermediate classes of fingers. When a post with a small cross-section passes through the insert, primarily the longer fingers interact to center the post. When a post with an intermediate cross-section passes through the insert, the primarily the longer fingers and the intermediate fingers interact to center the post. When a larger cross-section post passes through the insert, all of the fingers interact to center the post.

In another preferred embodiment, the capped central channel has a generally axially centered knock-out in the cap. The knock-out initially forms a seal of the cap. The knock-out is easily removed and after removal provides a centered aperture which might be engaged to allow the flower pot to be suspended from an overhead structure without interfering with or obscuring the outer shell. This allows the decorative aspects of the outer shell to remain fully visible. Position of the knock-out and aperture resulting therefrom are above the center of gravity of the flower pot and moreover positioned on the central axis of the outer shell and any growth media and flowers therein and therefore the suspended flower pot will be oriented with the central axis substantially vertical. Any minor tendency to shift off axis can generally be attributed to a mal-distribution of growth media and thus easily corrected by correcting the weight distribution of the flower growth media. Additionally, it may be preferable to provide an optional engagement and suspension means for the aperture generated by removal of the knock-out of the cap. Such engagement and suspension means might be a rope or cord with a knot exceeding the aperture diameter; a hook or eye bolt with a nut and optional washer, where the nut and optional washer may be positioned within the cap, the threads on the shank of the hook or eye bolt passing through the washer and engaging the nut, while the hook or eye remains above the cap; or a more complex arrangement with a long shank terminating in a hook or eye or lag screw on an upper end and a resilient toggle arrangement on the lower end. If the more complex arrangement is provided, it is preferred that entire the resilient toggle (or toggles), as well as the long shank and hook, eye, or lag screw, are plastic and molded to match the flower pot.

In another embodiment, the bottom panel of the flower pot is provided with at least one and preferably a plurality of knock-outs, the knock-out(s) originally providing a seal and subsequently providing an aperture for the egress of water from the flower growing space. Having at least one knock-out removed in the bottom of the flower growing space facilitates growth of flowers in many growth situations. In the case of flower pots of the present invention being marketed to consumers who will transport the pots to their residences, there may be advantages to leaving the original seal of the knock-out temporarily intact to help prevent or avoid inadvertent water damage to the consumer's automobile and allow the consumer to break the seal and/or remove one or more knock-outs subsequent to transport. More preferably, in this embodiment of the present invention, the bottom panel includes means for preventing water from traveling along the bottom panel to the post. Such means may be based upon any one or a variety of devices and or methods. One such means may be providing a feature in the bottom panel such that, when the flower pot is vertically oriented, the bottom panel surrounding any knock-out inclines toward the outer shell rather than the post. Alternatively, with a planar bottom panel, the knock-out is left partially attached and partially depending from the bottom panel to form a drip point leading downward from the aperture generated by partial knock-out removal, which partial knock-out need only proceed to the extent of breaking a seal between the knock-out and the bottom panel. Alternatively, the lower side of the bottom panel surrounding the knock out aperture may include a depending rib which rings or surrounds the panel. Alternatively, an irregular pebble or rock may be arranged inside the flower growing space so as to partially protrude downward and form a drip point to prevent water from traveling to the post.

In yet another embodiment, the present invention is a kit for protecting and decorating the top of a post. The present invention is also a kit for decorating a structure selected from the group consisting of a post, an overhead supporting structure, and a horizontal support surface.

In yet another embodiment, the present invention is a method of protecting and decorating a top of a post. The method includes the steps of providing a flower pot according to the disclosure, providing a post having a vertical arrangement beneath the post top, and placing the flower pot over the post top until the interior of the central channel of the flower pot comes to rest against the post top. Preferably, the method further includes the step of inserting a self-centering insert in the central channel to self-center the flower pot relative to a segment of the post. Preferably, the method further includes the step of providing growth media and flowers in the flower pot. Alternatively, the method includes the steps of providing a flower pot according to the disclosure, removing a knockout, and suspending the flower pot from an overhead support. Preferably, the alternative method further includes the step of providing growth media and flowers in the flower pot. It should be noted that the flower pot of the present invention is versatile in that it allows three types of structures to be decorated, as disclosed by the following inventive method. More specifically, in yet another alternative method, the method of the present invention includes the steps of providing a flower pot according to the disclosure, selecting a structure to be decorated, the structure selected from the group consisting of a vertical post top, an overhead support structure, and a horizontal support surface. Next, the method includes the step of placing the flower pot over placing the flower pot over the post top until the interior of the central channel of the flower pot comes to rest against the post top, if the selected structure was a vertical post top, and knocking-out a knock-out in the cap and then suspending the flower pot from the overhead structure, if the selected structure is an overhead support and placing the flower pot on the horizontal support surface if the selected structure is a horizontal support surface.

DETAILED DESCRIPTION

Figure 1:
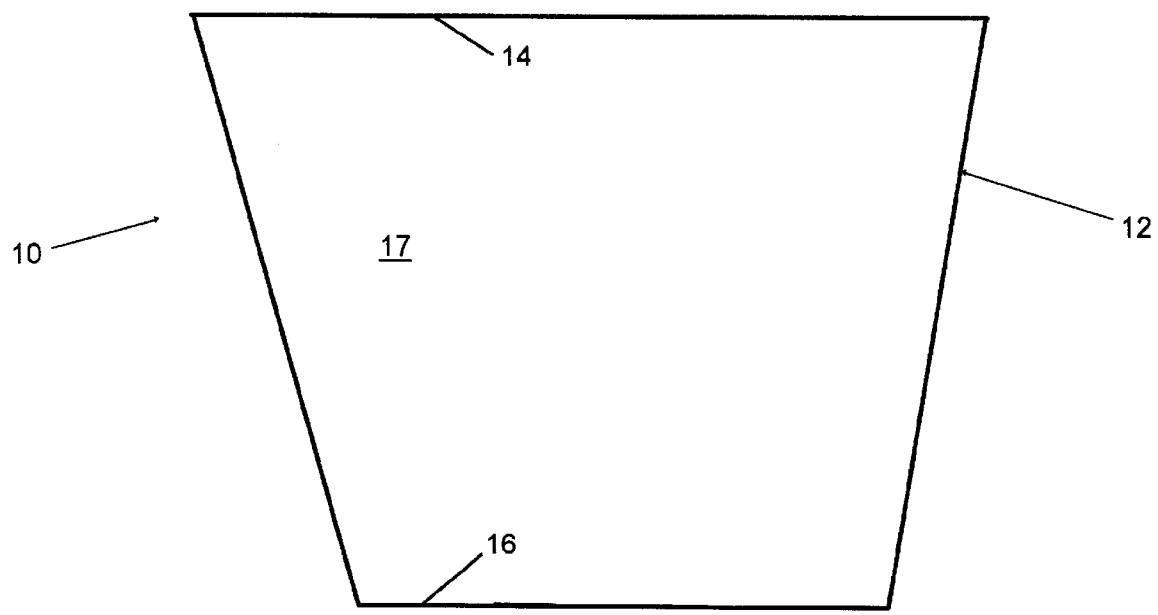
FIG. 1 shows a side plan view of a flower pot according the present invention.

In a first embodiment, the present invention is a flower pot 10 shown generally in FIG. 1, for covering and protecting the upper end of a vertical post. The flower pot 10 has an outer shell 12. The shell 12 preferably is radially symmetrical about a central axis 70, shown in cross-sectional FIG. 4, and may be cylindrical or frustoconical or a variety of other, preferably radially symmetrical, shapes. For ease of explanation only, the outer shell 12 of the invention 10 is shown generally herein as a frustoconical shape. The outer shell 12 has an upper end 14 and a lower end 16. The outer shell 12 also may be decorated. A significant feature of the present invention is that the outer shell 12 and any decoration thereon need not be obscured by a hanger or other prior art means of attachment.

Figure 2:
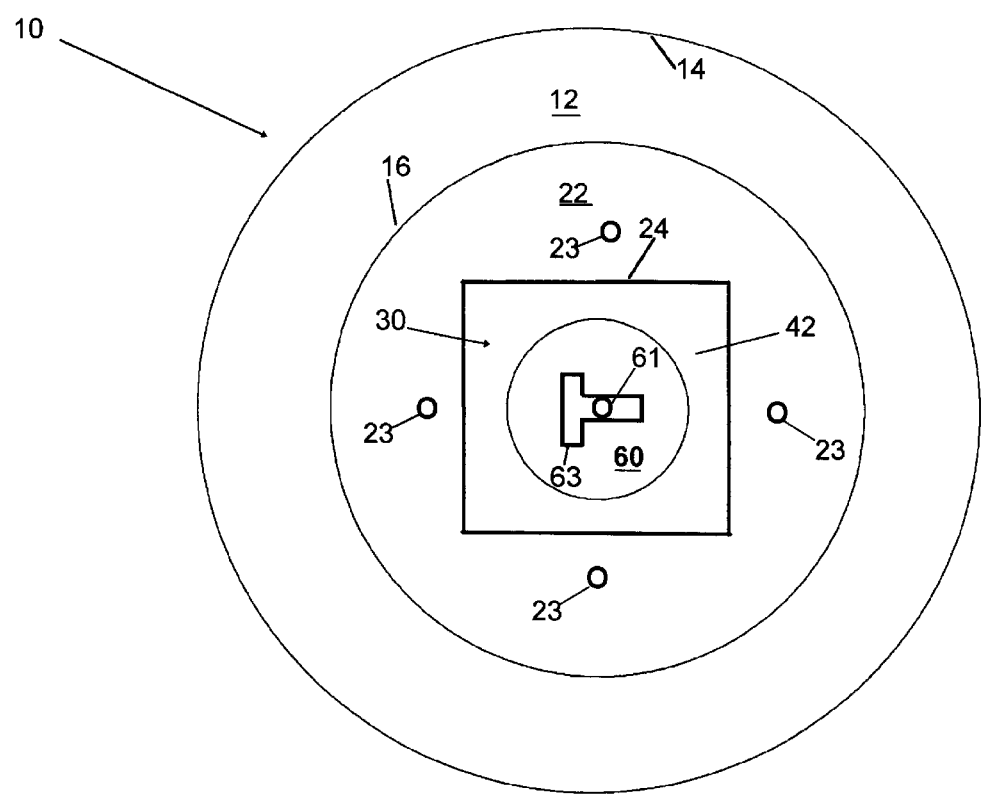
FIG. 2 shows a bottom view of the invention of FIG. 1.

Attached to the outer shell 12, adjacent to or at the lower end 16 of the outer shell 12, is a bottom panel 22, as depicted in FIG. 2. Although the bottom panel 22 is depicted as generally planar herein for ease of explanation, it should be understood that the bottom panel 22 need not be planar and might be shaped in other ways for either decorative or functional purposes. For example, the bottom panel 22 might be concave, or partially spherical, with a lower edge adjacent the outer shell 12, or slightly frustoconical, again preferably with a lower edge adjacent the outer shell 12, or might be slightly raised from lower end 16 in it's attachment to the outer shell 12, or might form a continuous and uninterrupted surface with the outer shell 12. At least one, and preferably a plurality, such as by way of example four, knock-out 23 are present in the bottom panel 22. The knock-outs 23 are initially sealed to prevent unwanted leakage from the bottom of the flower pot 10, during, for example, transport in consumer's automobile, and yet allow drainage to be provided later when desired for flower growth. Most preferably, the four knock-outs 23 are even distributed, for example at 90° about the central axis 70. When removed, it may sometimes be advantageous to allow the knock-outs 23 to remain partially attached to provide a drip point to discourage water drainage from traveling to the vertical post and accelerating deterioration of the post. Alternatively, the bottom panel may be non-planar, as discussed earlier, to discourage water from traveling to the post or alternatively a small pebble or rock may partially protrude from the aperture formed by removing a knock-out 23. A preferred size for these knock-outs 23 is on the order of about $3/8$ inch, however, larger or smaller sizes or a mixture of various sizes may be provided.

Centered in the bottom panel 22 is a square aperture 24. A capped central channel 30 is aligned with the square aperture 24 and connected to the bottom panel 22. The capped central channel 30 leads past a transition channel and eventually terminates at an upper end of the capped central channel 30 at a domed cap 60. The capped central channel 30 will be further explained subsequently. In the cap 60 is a knock-out 61, which is initially sealed. The knock-out 61 may be removed if the flower pot 10 is to be suspended, an alternative application to covering and protecting a vertical post top. Also present in the underside of the cap 60 is a recess 63 corresponding in size and profile to the top of a common "T" profile steel or iron fencing post. The recess 63 is relative shallow and does not penetrate or significantly weaken the cap 60. However, the shallow recess 63 serves to stabilize the flower pot 10 on a "T" and cause the "T" post top to center in the cap 60. Note that the recess 63 tends to correspond to the knock-out 61 in the centered high-point of the cap 60.

Figure 3:
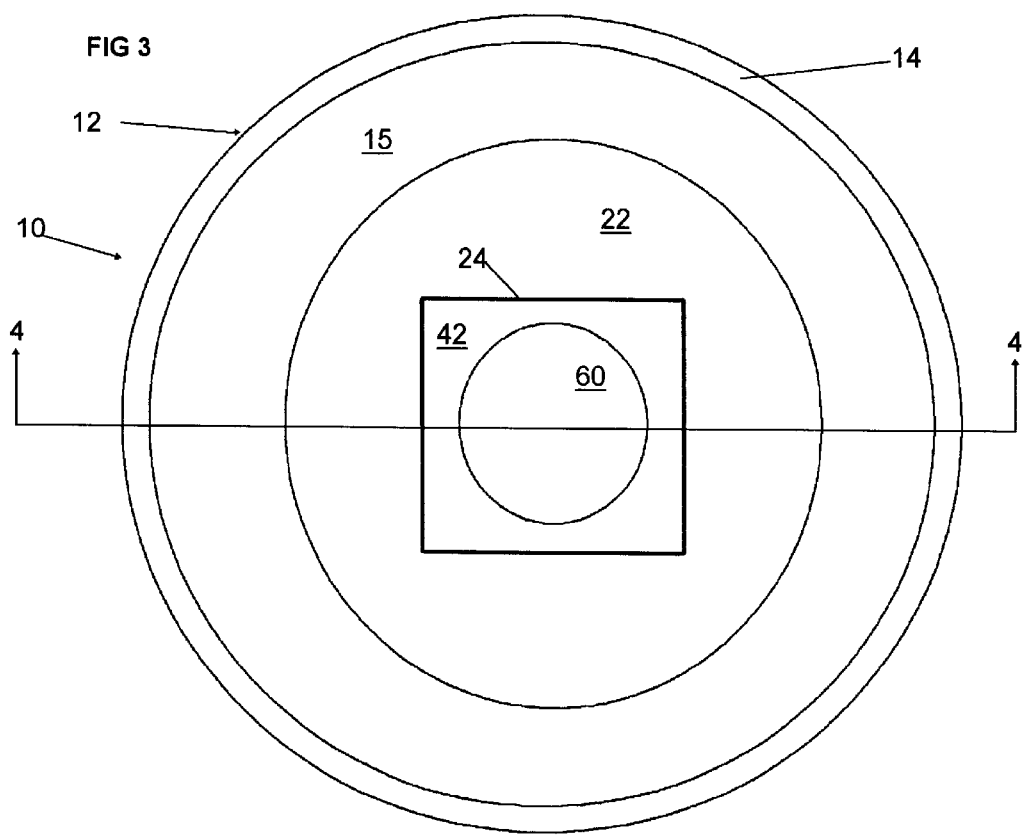
FIG. 3 shows a top view of the invention of FIG. 1.

As shown from a top view in FIG. 3, the flower pot 10 of present invention has an outer shell 12, a bottom panel 22 connected to a square central channel 32 which is aligned with the earlier mentioned square aperture 24. The earlier mentioned transition central channel 42 is connected to the square central channel 32 and leads to a cylindrical central channel 52 which ends at a cap 60.

Figure 4:
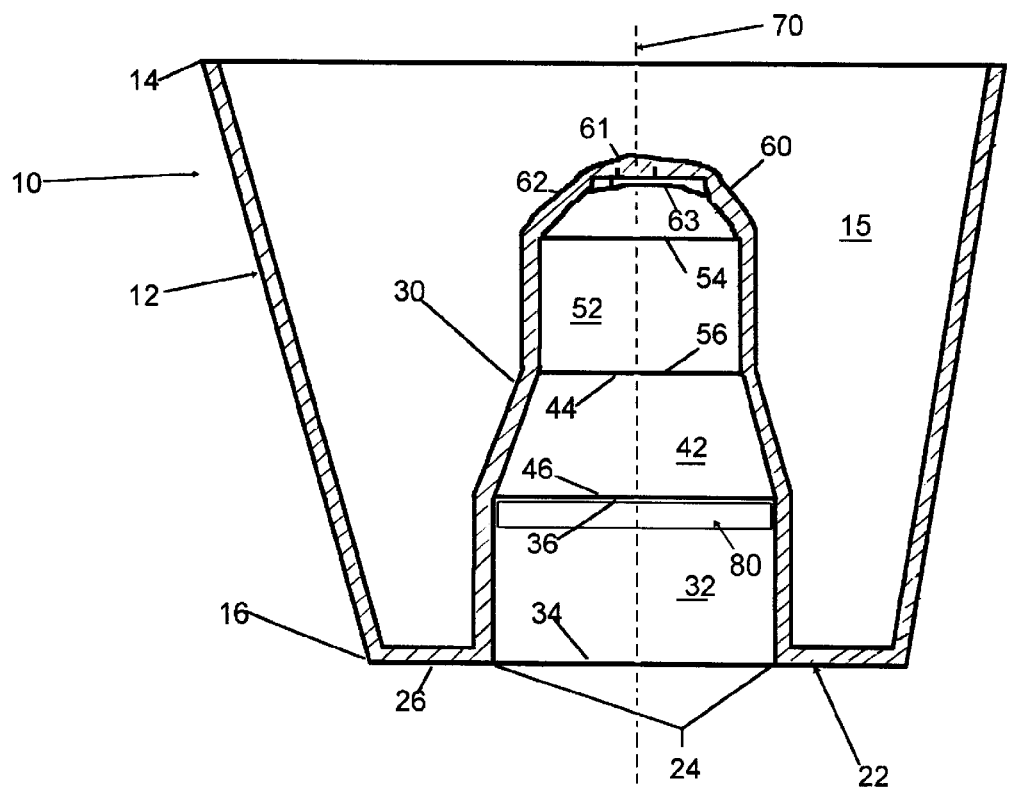
FIG. 4 shows a sectional view of the invention of FIG. 1.

FIG. 4 is a sectional view showing the outer shell 12, with an upper edge 14, inside surface 15 and outside surface 17, the bottom panel 22, and the capped central channel 30. The capped central channel 30 includes the square central channel 32 connected at a lower end 34 to the bottom panel 22, aligned with the square aperture 24, and having a square channel upper end 36. Connected to the square channel upper end 36 is lower end 46 of the transition central channel 42. The lower end 46 of the transition central channel 42 is square and aligns with the square central channel 32. The transition central channel 42 also has an upper end 44, which is round. The upper end 44 connects to a cylindrical central channel 30 at a lower end 56 of the cylindrical central channel 52. At the upper end 54 of the cylindrical central channel 30 is a cap 60. Preferably, the cap has a domed top 62. Alternatively, the cap 60 may be conical or ovoid or semi-spherical or other related or similar shapes that have the property of imparting a self-centering tendency relative to a post top, when the post top is small enough in diameter to reach the cap 60 at the upper end of the central channel 30.

Preferably, the capped central channel 30 also is characterized by the presence of a self-centering mechanism for centering a segment of a post within the capped central channel 30 of the flower pot 10. Most preferably, this self-centering is accomplished within the square central channel 32 by means of an insert 80, shown in more detail in FIGS. 5A and 5B. A plurality of resilient fingers 82 are present on the insert 80 and project axially inward from walls of the square central channel 30, from adjacent the top 36. The fingers 82 tend to bias or urge a segment of post between the fingers 82 inwardly to the axis 70 and thereby self-center the post-segment relative to the flower pot 10 or alternatively self-center the flower pot 10 relative to the post segment within the square central channel 30.

On a smaller diameter post, the combination of self-centering within the square central channel 30 by fingers 82 and the self-centering of the cap 60 serve to orient the flower pot 10 into alignment with a smaller diameter post. On larger diameter posts, of a diameter that does not fully extend to the cap 60, a self-centering relative to the post top occurs by interaction with the transition central channel 42. Note that square posts of a size that will match the square aperture 24 and square central channel 32 will encounter come to rest against the insert 80. This situation might also be considered as aligning the flower pot 10 with the post top and post segment beneath the post top. A round post of a maximum diameter to enter the square aperture 24 and square central channel 32 will also have a segment of the post self-centered by the square channel 32 and have its top centered by the upper region of the square channel 32 as its top abuts the insert 80. For smaller posts, which reach the cap 60, the length of the cylindrical central channel contributes to the self-centering effect of the domed top 62 and additionally serves a back-up to reduce the likelihood that the post will escape from the capped central channel 30. In each situation, a post that passes the aperture 24, having a post axis, is urged into co-axial alignment with the axis 70 of the flower pot 10 or, viewed otherwise the flower pot 10 will self align upon the post. In a preferred alternative embodiment, the fingers 82 are not only resilient but also have a centralized inwardly directed grip upon the post segment and thus can have the additional function of gripping the post segment and thereby capturing the post within the capped central channel 30. The cap 60 serves to help preserve the post by preventing moisture from contacting the post and thereby reducing rot or rust at the top of the post.

Figure 5A:
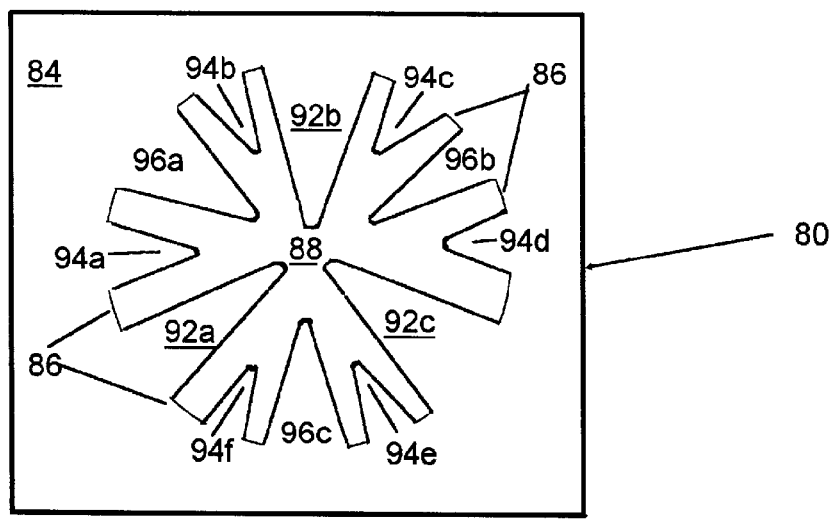
FIG. 5A shows a top plan view of a self-center insert and FIG. 5B shows a side view of the self-center insert.
Figure 5B:
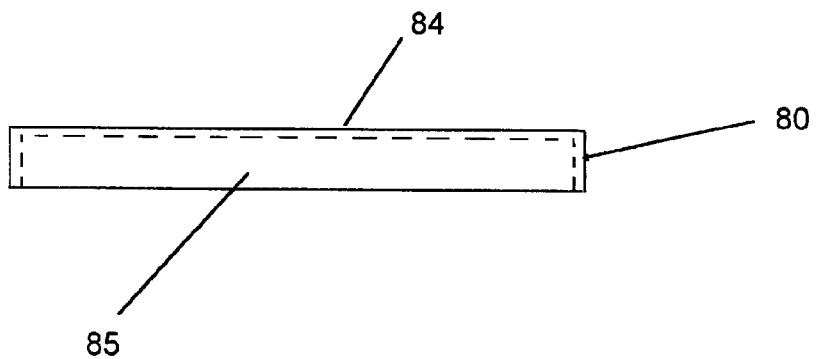

As shown in FIG. 5A, fingers 82 are present in self-centering insert 80. The insert 80 has square shaped panel 84, optionally and preferably, depending walls 85. For a rough guide to sizing, for a flower pot having a rough sized square channel 32 of about 3.5–4 inches, the side walls 85 might be about $1/4$ inch vertically and the plastic or other suitable material only about $1/16$ inches in thickness although numerous other dimensions could be employed successfully. The insert 80 is sized to be a press fit in the upper end of the square channel 32 and preferably does not enter the transition channel 42. Centered in the square shaped panel 84 is an aperture 88. The aperture 88 is irregularly shaped and has a plurality of center oriented resilient fingers 82 which serve to self-center relative to a segment of post passing though the aperture 88 and interacting with the fingers 82. Preferably, there are several sets or classes of fingers 82 present. Most preferably, the fingers include a long class of fingers 92, a short class of fingers 94, and an intermediate set of fingers 96 with a length intermediate the long and short classes of fingers, 92 and 94 respectively. Most preferably the fingers 82 are distributed about the outer most periphery 86 of the aperture 88 such that they are radially spaced and distributed evenly with respect to members of their own class and any other classes of fingers 82 present. In a most preferred embodiment of the insert of the present invention, the class of longer fingers 92 consists of three fingers 92a, 92b, and 92c, each oriented and radially distributed about the center axis 70 of the flower pot 10, at about 120° to each other; the class of intermediate fingers 96 consists of three fingers 96a, 96b, and 96c each oriented and radially distributed about the center axis 70 at about 120° to each other and offset at about 60° to the class of longer fingers 92; and the class of shorter fingers 94 consists of six fingers 94a, 94b, 94c, 94d, 94e, and 94f, each oriented and radially distributed about the center axis 70 at about 60° to each other and offset at about 30° relative to members of the longer and intermediate classes of fingers 92 and 96 respectively. When a post with a small cross-section passes through the insert 80, primarily the longer fingers 92 interact to center the flower pot 10 relative to the segment of the post. When a post with an intermediate cross-section or diameter relative to the central channel 30 passes through the insert 80, primarily the longer fingers 92 and the intermediate fingers 96 interact to center the flower pot relative to the segment of the post. When a larger cross-section post passes through the insert 80, all of the fingers 82 interact to center the flower pot relative to the segment of the post.

To prepare the flower pot 10 of the present invention, the flower pot is molded of plastic. Suitable plastics to prepare the flower pot might be chosen from such plastics as are known to plastic molders, which may include, such as for example the plastics: polyvinyl chloride, styrene, polypropylene, and various co-polymers. Due to exposure to elements in the out door, consideration should also be given to the addition of filler and UV protection to add durability. It will further be recognized that the thickness of the plastic or other suitable material must be at least commensurate with the weight to be born by the flower pot 10, when carrying growth media and flowers. It will be readily recognized that the central channel 30 and bottom panel 22 bear considerable weight in larger variations of the flower pot 10 and thus thickness and strength are most important in those areas. The posts which are considered appropriate are "T" shaped steel fence posts, ¾ inch, 1 inch, 1¼ inch, 1½ inch posts of metal and wood, round wooden posts of about 3 inches in diameter and square posts of wood of about 3.5 inches–4 inches, and preferably about 3⅝ inches each side dimension in square posts, are particularly suited for decoration and protection by the present invention. The upper diameter of a relatively vertical walled, but slightly frustoconical, outer shell 12 may be 6, 8, 10 or 12 inches. However, it should be recognized that the present invention can be scaled larger, so as to decorate very substantial posts such as 6 inch square posts, 8 inch square posts, 6 inch diameter round posts, 8 inch diameter round posts and even common telephone posts. Larger posts of the type encountered in temporary or permanent marinas are also contemplated.

Those of ordinary skill will recognize that the flower pot of present invention may have a variety of outer shell shapes and sizes provided in a consistent relationship with the bottom panel and capped central channel and accomplish the present invention by allowing a decorative and protective self-centering cover for a variety of tops of posts. Various modifications can be made to the present invention without departing from the spirit of the invention.

I claim:

1. A flower pot comprising:
    an outer shell, the outer shell having a generally axially symmetrical shape with an upper end and a lower end, defining a central axis;
    a bottom panel adjacent to the lower end of the outer shell;
    a square aperture centered in the bottom panel;
    a square central channel connected to and aligned with the square aperture, the square channel having a lower end and an upper end;
    a transition central channel connected to the upper end of the square central channel, the transition central channel having a lower end and an upper end;
    a cylindrical central channel connected to the upper end of the transition central channel, the cylindrical central channel having an upper end and a lower end;
    an end cap connected to the upper end of the cylindrical central channel, the end cap including means for centering a post end;
    the square central channel, the transition central channel, the cylindrical central channel and the end cap together defining a capped central channel disposed along the central axis; and
    means for centering the flower pot relative to a post segment within the capped central channel, wherein the post segment is selected from a variety of post segments, the variety including larger diameter posts having a diameter incapable of extending to the end cap, and smaller diameter posts which extend to the end cap.

2. The flower pot of claim 1 and wherein the flower pot is formed of molded plastic.

3. The flower pot of claim 1 and wherein the means for centering is an insert in the square central channel.

4. The flower pot of claim 1 and wherein the means for centering includes a plurality of radially inward directed fingers.

5. The flower pot of claim 4 and wherein the plurality of radially inward directed fingers include a first class of fingers of a first length and a second class of fingers of a second length.

6. The flower pot of claim 5 and wherein the plurality of inward directed fingers includes a third class of fingers having a third length.

7. The flower pot of claim 6 and wherein the first class of fingers includes three fingers, the second class includes three fingers and the second length is shorter than the first length, and the third class of fingers includes six fingers and the third length is shorter than the second length.

8. The flower pot of claim 1 and wherein the bottom panel includes at least one initially sealed knock-out.

9. The flower pot of claim 1 and wherein the cap includes an initially sealed knock-out.

10. A flower pot for capping a post, the flower pot comprising:
    a capped central channel, the capped central channel defining an axis and including:

an end cap with means for centering a post end relative to the end cap, a cylindrical central channel connected at an upper end to the end cap, a transition central channel connected at an upper end to a lower end of the cylindrical channel, a square central channel connected at an upper end to a lower end of the transition channel, the square central channel having a lower end, and, means for centering relative a post segment within the capped central channel, wherein the post segment is selected from a variety of post segments, the variety including larger diameter posts having a diameter incapable of extending to the end cap, and smaller diameter posts having a diameter extendable to the end cap;

a bottom panel connected to the lower end of the square central channel of the square central channel and having a square aperture aligned with square central channel of the capped central channel; and, an outer shell connected to the bottom panel at a lower end of the outer shell, the outer shell being radially symmetrically disposed about the axis and defining a flower growing space between the capped central channel and the outer shell.

11. The flower pot of claim 10 and wherein precipitation is diverted by the end cap from the post top to the flower growing space.

12. A flower pot for capping a variety of posts, comprising:

a square central channel, the square channel having a lower end and an upper end;

a transition central channel connected to the upper end of the square central channel, the transition central channel having a lower end and an upper end;

a cylindrical central channel connected to the upper end of the transition central channel, the cylindrical central channel having an upper end and a lower end;

an end cap connected to the upper end of the cylindrical central channel;

wherein the square central channel, the transition central channel, the cylindrical central channel and the end cap together define a capped central channel within the flower pot; and means for centering the flower pot relative to a post segment within the capped central channel, wherein the post segment is selected from a variety of post segments, the variety including larger diameter posts having a diameter incapable of extending to the end cap, and smaller diameter posts which extend to the end cap.

\* \* \* \* \*